June 7, 1960  F. W. LEUTHESSER  2,939,484
MIXING FAUCET
Filed Nov. 23, 1955  2 Sheets-Sheet 1
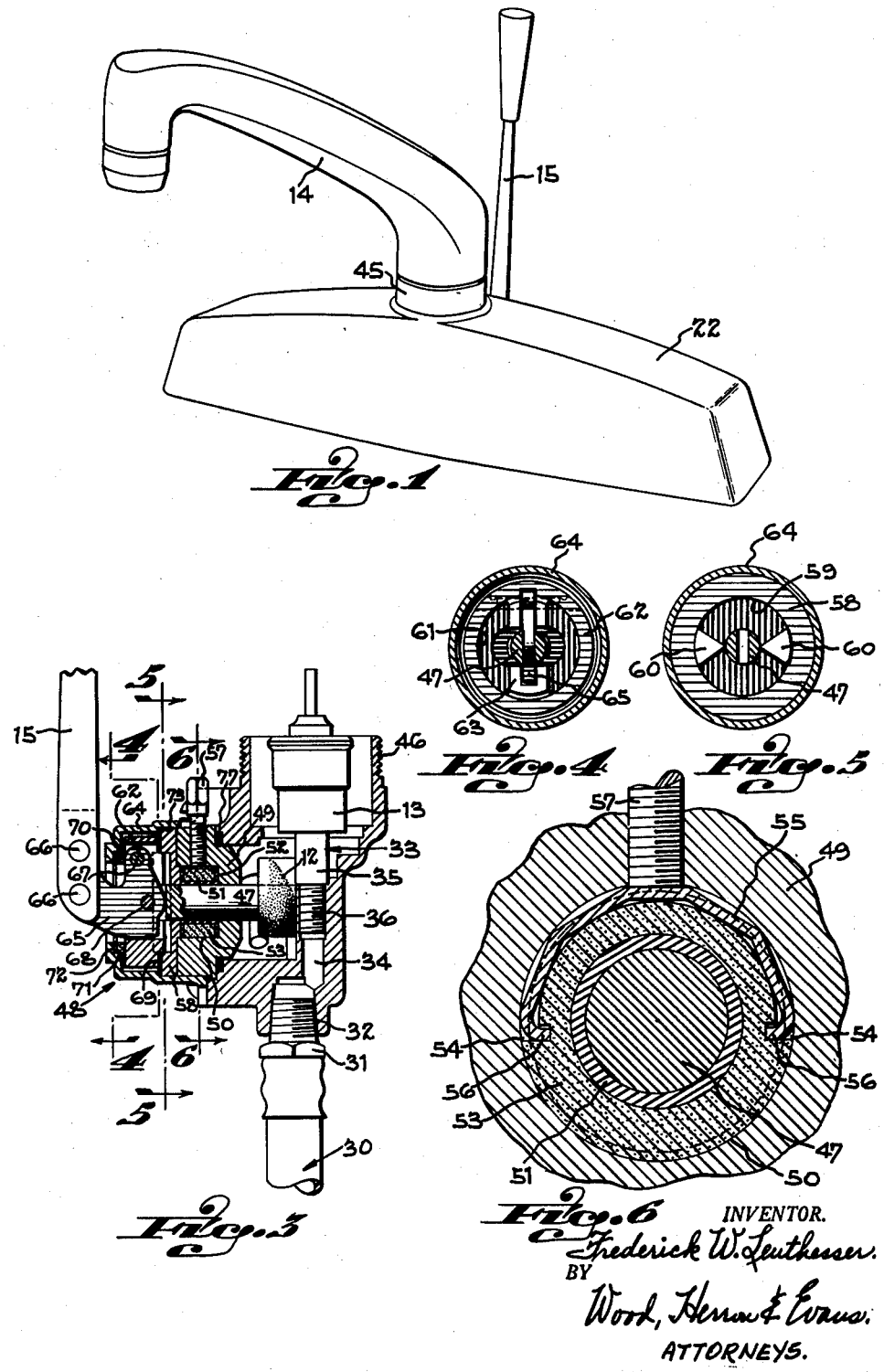
INVENTOR.
Frederick W. Leuthesser.
BY
Wood, Herron & Evans.
ATTORNEYS.

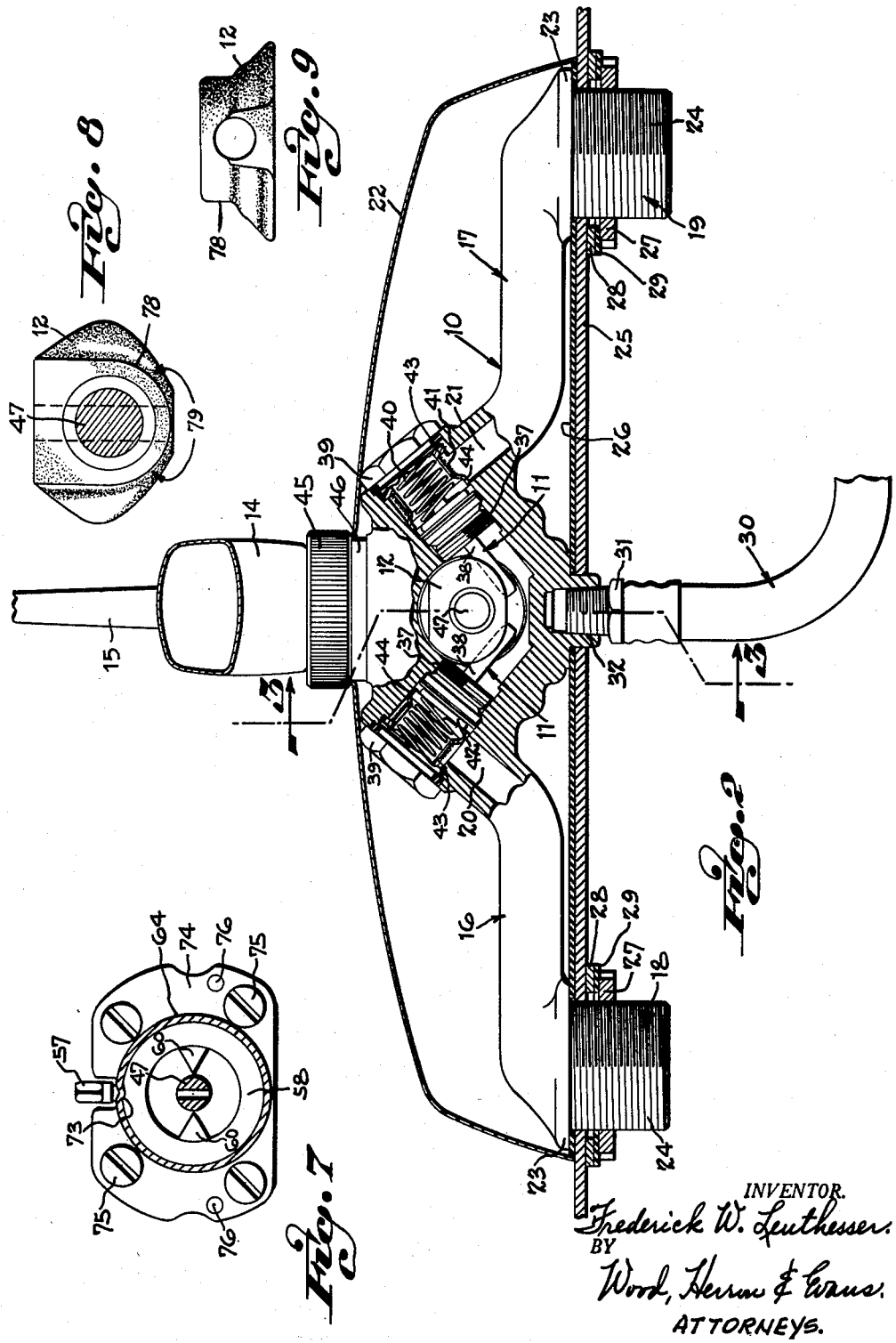

United States Patent Office 2,939,484
Patented June 7, 1960

2,939,484

MIXING FAUCET

Frederick W. Leuthesser, Cincinnati, Ohio, assignor, by mesne assignments, to American Radiator & Standard Sanitary Corporation, New York, N.Y., a corporation of Delaware Filed Nov. 23, 1955, Ser. No. 548,613

3 Claims. (Cl. 137—635)

This invention relates to faucets and it is directed in particular to an improved mixing faucet construction in which a single operating handle is employed to control and regulate the flow of hot and cold water from the faucet spout in all proportions within the temperature range of the water in the respective hot and cold supply lines. The present invention constitutes an improvement over the disclosure of my copending patent application Serial No. 370,406, filed July 27, 1953, now Patent No. 2,871,880.

In the faucet of the copending patent application two toggle valves are employed to control the flow of water from the respective hot and cold water supply lines into the body of the faucet. The valves are actuated by means of a cam which may be both rotated and shifted to selectively actuate the respective valves. One of the improvements of the present invention resides in the arrangement of the toggle valves. In the copending application the valves are located inside of the faucet body in such a position that it is necessary to remove several of the faucet parts in order to gain access to the valves for replacement or repair. In the improved faucet the valves are located at the respective opposite sides of the faucet body and each one is immediately accessible by removing a threaded plug.

Additionally, the present faucet incorporates a pair of strainers which are so located with respect to the toggle valves that they prevent the entrance of any foreign materials into the valves which might possibly become wedged between the valves and their seats and thus prevent the valves from seating properly. In the preferred embodiment these screens are formed as an integral part of the threaded plugs which enclose the valves and are disposed so that foreign bodies are free to fall away from the screens when the water is shut off.

The faucet also includes an improved seal for the faucet handle and the means which joins the handle to the valve actuator cam located inside of the faucet body. Additionally, the improved faucet body comprises a body casting which adapts it for installation in sinks of standard construction and design in which the water supply lines are spaced on eight inch centers.

Other improvements and features of the present construction will be readily apparent to those skilled in the art from the following detailed description of the drawings in which:

Figure 1 is a perspective view showing a single lever faucet incorporating the principles of the present invention.

Figure 2 is a longitudinal cross sectional view taken through the faucet of Figure 1.

Figure 3 is fragmentary cross sectional view taken on the line 3—3 of Figure 2.

Figure 4 is a fragmentary cross sectional view taken on the line 4—4 of Figure 3.

Figure 5 is a fragmentary cross sectional view taken on the line 5—5 of Figure 3.

Figure 6 is an enlarged, fragmentary cross sectional view taken on the line 6—6 of Figure 3.

Figure 7 is a fragmentary cross sectional view, also taken on line 5—5 of Figure 3, showing the back of the central part of the faucet.

Figure 8 is an enlarged elevational view showing the rear face of the actuator cam.

Figure 9 is an elevational view showing the underside of the cam.

The body of the faucet comprises a casting which is indicated generally by the numeral 10. The casting is the supporting and locating frame for the other components of the faucet. The central part of the casting mounts a pair of toggle valve assemblies indicated generally at 11—11, a cam 12 for actuating the valves and a diverter valve 13. The central part of the body casting also mounts a swing spout 14 and an operating handle 15. A pair of arms designated generally by the numerals 16 and 17 extend from the respective opposite sides of the central part of the body casting and these arms have water supply line connectors 18—19 at their opposite ends. The respective arms 16—17 are hollow to provide passageways 20—21 respectively for hot and cold water. The entire faucet body is enclosed within an escutcheon or housing 22.

More specifically, the connector at each of the ends of arms 16—17 comprises a circular flange 23 from which depends a threaded shank 24. Each shank is of such a diameter so as to fit down through the water supply line opening in a conventional sink, a portion only of a sink being indicated at 25. Preferably the respective connectors 18—19 are spaced on eight inch centers to fit such sink constructions. The respective circular flanges 23 rest upon a gasket 26 which may be made of plastic, rubber or some other cushioning material. The faucet is secured to the sink by means of nuts 27—27 which thread onto the respective shanks 24. A pair of washers 28—29, the lower one of which is made of resilient material, are interposed between the nut and the bottom of the sink on each shank. A hose such as the one indicated generally by the numeral 30 extends from the underside of the faucet body to a spray or other auxiliary device. The hose is connected by means of a coupler 31 to the body of the faucet, being threaded into a bushing 32 which depends from the underside of the body of the faucet through an opening to the underside of the sink.

The diverter valve 13 which is employed in the present construction is one which is available commercially. The construction and operation of this valve is substantially identical to diverter devices disclosed in Patents No. 2,172,345 and 2,314,071 and for this reason are not described in detail here. Briefly, a slidable piston in the diverter valve is arranged so that water will flow upwardly and outwardly through the faucet spout, whenever the water is turned on, so long as the valve in the sink spray is closed. When the sink spray is opened, however, the slidable piston within the valve blocks the flow of water to the spout and diverts it downwardly through a tailpipe, indicated generally at 33, and thence through a passageway 34 in the faucet body to the hose 30. In order to accommodate the diverter valve to the present construction, a tailpipe extension 35 is provided. The lower end of the tailpipe has threads 36 provided on it which are engaged into a tapped bore in the upper end of the passageway 34 to secure the diverter in place. The tailpipe it will be noted resides in the casting ahead of the cam 12 which is located substantially in the center of the faucet body.

Where the two arms enclosing passageways 20—21 meet the central part of the body casting of the faucet, they turn up at approximately 50 degrees to the horizontal. The two toggle valve assemblies are disposed on axes which form a V as seen in Figure 2, the two axes being in the same vertical plane with each axis being at substantial right angles to the adjacent passageway 20 or 21. Hence, the angle inside of the V is approximately 100 degrees. The specific angles are given in describing the preferred embodiment and are not critical to the operation and construction of faucets incorporating the broad principle of the invention.

Each valve assembly comprises a valve insert 37, a valve stem 38, a threaded plug or cap 39, a spring 40 and a cylindrical screen 41. The insert 37 mounts a resilient valve seat which in the preferred embodiment is made of Buna-N rubber molded to the metal body of the insert. The insert has threads upon it so that it may be tightened down into the body of the faucet. The insert is hollow so that a water passageway is provided through it. The valve itself comprises an elongated stem having a disk 42 thereon which is adapted to contact the rubber seat for closing the valve. The cap or plug 39 has a hexagonal head thereon which is formed as an integral part of a threaded boss 43 adapted to thread into an appropriately threaded bore at the side of the faucet body. The plug is tightened down onto a gasket which is immediately under the hexagonal head to seal the opening. The spring 40 is seated between the toggle valve and the underside of the plug or cap so that it exerts a downward, closing pressure on the valve. The screen 41 preferably is secured to the underside of the plug by soldering or the like to constitute an extension of the boss 43. The inner end of the screen has an annular ring 44 thereon which fits around the disk 42 of the valve in the bore in which the valve is mounted at a point inwardly of the entrance of the water supply passageway so that any water which enters the valve must pass through the screen.

The inside of the faucet body is hollow and the valve actuator cam 12 is disposed therein just to the front of the plane in which the two axes of the valves are located. The cam is substantially in the shape of the one disclosed in copending patent application Serial No. 370,406, now Patent No. 2,871,880. Generally, movement of the cam to the rear, without any rotational movement, causes the cam to engage both stems and toggle them equally to open both of the valves. The opening movement becoming progressively greater as the cam moves toward the rear. On the other hand, rotational movement of the cam causes one of the valve stems to be opened to a greater degree than the other. Thus, if the handle of the faucet as shown in Figure 1 is swung all of the way toward the right or to the left from the upright position shown, with the cam ahead of the axes of the valve stems, neither valve stem is toggled, even though the cam is rotated. It is only when the handle is pulled forward, as will be explained in detail at a later point, that the water is turned on. Pulling the handle forward from the erect position of Figure 1 causes the cam to move straight back for opening both valves an equal amount. Pulling the handle forward from a position toward the right causes only cold water to be turned on. Pulling it straight forward from a position to the left causes only the hot water to be turned on. In positions between the two extremes all proportions of hot and cold are available, and in amounts depending upon how far the handle is pulled forward.

The end of the valve actuator cam designated 78 in Figures 8 and 9, which is adjacent to the plane of the V formed by the axes of the stems of the valves, is slightly smaller than the space between the two stems and the longitudinal axis of the actuator shaft so that it clears the stems. On the other hand, the end of the cam away from the plane of the V is considerably larger and the cam has slanting surfaces 79—79 thereon which progressively flare out away from the central axis of the shaft 47, going from the smaller end of the cam to the larger end thereof. Hence, upon movement of the actuator into the plane of the V the surfaces of the cam to first make contact with the sides of the valve stems are angulated with respect to the central axis of the actuator shaft to a degree substantially less than the surfaces to come into contact with the stem as the larger end of the cam is brought into contact with the stems. As a result, the movement of the valve stems per unit of longitudinal movement of the valve actuator shaft is substantially less during the initial opening or "cracking" of the valves than the movement of the valve stems per unit of longitudinal movement of the valve actuator shaft when the larger end of the cam is brought into contact with the sides of the valve stems.

The swing spout 14 which is employed is substantially identical to the one shown in copending patent application Serial No. 370,406, now Patent No. 2,871,880, and it is secured to the body of the faucet in a similar fashion, having a rotatable nut 45 thereon which threads onto the upper end of an upstanding sleeve 46 cast as an integral part of the faucet body. The faucet has inside of the nut a valve insert (not shown) which is adapted to engage on top of the diverter and cooperate with the slidable piston of the diverter valve to block the flow of water from the spout when the spray or other device to which the hose 30 is attached is open. The sleeve 46 of the faucet has a bore in it which is substantially larger than the diameter of the diverter valve and this bore opens into the central part of the faucet into which the valve stems extend so that water may flow from the central part of the faucet upwardly around the diverter and thence to the faucet. Under conditions in which the water is diverted to the spray, the sliding piston of the diverter valve coves upwardly to block the port in the valve insert of the spout at which time the water flows downwardly through the diverter, through tailpipe 33 and into the hose 30.

The cam 12 is pinned to the forward end of a shaft 47. This shaft extends toward the rear of the faucet and out through a seal assembly designated generally 48. It will be noted that there is a substantially large cylindrical bore entering the body of the faucet from the rear. The bore is slightly larger than the diameter of the cam 12. The seal for shaft 47 resides within a control mount 49. The forward end of the control mount has a bore therein to receive shaft 47 in sliding relationship. The rear face of the control mount has a substantially larger counter bore 50 therein in which the seal is seated. The seal comprises a tube 51 which is made of tetrafluoroethylene (Teflon). This material is employed because of its ability to conform closely to a surface against which it is held under pressure. The Teflon tube surrounds shaft 47 and it has its opposite ends turned outwardly at right angles to the shaft to provide radial flanges 52—52. There is a seal enclosure 53 seated within the annular groove surrounding the Teflon tube to fill the space between the two end flanges 52—52. The seal enclosure is made of Buna-N rubber. The upper half of the seal enclosure is of a smaller diameter than the lower half of the two sides of the enclosure are notched as at 54—54 in order to accommodate a flat seal spring 55. The seal spring is generally in an arcuate shape to fit inside of the space provided by the reduced diameter in the upper portion of the enclosure and the lower ends of the spring are turned inwardly as at 56—56 so as to fit into the grooves 54—54. The spring is made up of a plurality of straight segments which contact the upper portion of the enclosure in tangential relationship. A flat is also provided at the top of the seal spring and this flat constitutes a seat for an adjustment screw 57 which threads down through the control mount from the outside of the faucet.

Referring now to Figure 6, it will be seen that the adjusting screw may be tightened to put downward pressure upon seal spring and that this downward pressure is transmitted to the upper half of the enclosure through direct contact with the flat surfaces of the seal spring and to the bottom half of the enclosure through the inwardly turned ends of the spring 56—56. Since the Buna-N rubber seal enclosure is seated within the counter bore 50 inside of the control mount the pressure thus applied to it causes it to act like a liquid so that it distributes the pressure equally to the entire tubular portion of the Teflon seal causing it to tightly grip the surface of the shaft which it contacts. The Teflon material is "slippery" so that even though there is a considerable amount of gripping pressure on the shaft, the shaft nevertheless is free to be rotated and to be slid lengthwise within the seal.

The seal assembly is confined within the control mount by a circular boss on the forward face of a shaft bearing plate which is designated 58. The shaft extends through an appropriate bore in the center of the shaft bearing plate and the boss is machined on the forward face of the plate 58 so that it is concentric to the central axis of the shaft and of such a diameter that it fits snugly into the outer end of the counter bore in which the seal is mounted. Hence, the Teflon seal is confined on all sides so that it cannot flow under pressure, which is one of its characteristics.

A substantially large central recess 59 is provided in the rear face of the shaft bearing plate. This recess is concentric to the central axis of shaft 47. At the opposite sides of the shaft and within recess 59 a pair of wedged shaped stops 60—60 are provided. These stops are an integral part of the bearing plate and extend to the rear of the faucet and into a recess 61 which is in the forward face of a pivot bearing member 62 for the faucet handle 15. The pivot bearing member has projections 63 upon it which extend toward the front of the faucet and into the recess 59 of the shaft bearing plate. The pivot bearing is arranged so that it turns or rotates with the faucet handle when the handle is swung from side to side. As may be seen in Figure 4 the projections extend generally across the diameter of the recess 61 in the pivot bearing so as to present flat sides which may engage the stops 60—60 to define limits of travel for the faucet handle from side to side.

The entire seal and handle pivot assembly is enclosed within a cap 64 which is mounted upon the back of the faucet body. The rear wall of the cap is open in order to accommodate a pivot plate 65. The lower end of handle 15 is bifurcated to provide a slot into which the outer end of pivot plate 65 is received. The handle and the plate are secured together by means of a pair of rivets 66—66. The pivot plate is rotatably journalled inside of the pivot bearing on a pin 67 which extends across the pivot bearing adjacent to its top on an axis which extends at right angles to the axis of the cam shaft. The outer end of shaft 47 is also bifurcated to receive the pivot plate, and the plate is fastened inside of the slot in the shaft by means of a cross pin 68. The latter pin fits somewhat loosely in the bore which it traverses in the pivot plate so as to not bind the shaft 47 when the handle is swung forward to rotate the pivot plate about the pin 67.

The pivot bearing member 62 is confined within the outer end of the cap between a nylon washer 69 which is seated against the outer face of the shaft bearing and a nylon washer 70 which is mounted within an annular seat 71 provided at the inside of cap 64 surrounding the opening therein through which the pivot plate 65 extends. A leaf spring washer 72 may be provided in the seat for the nylon washer 71 to take up for any wear which may occur as a result of the rotation of the pivot bearing during use of the faucet.

The cap 64, at the top, where it makes contact with the shaft bearing plate is struck inwardly into a dimple 73 formed in the bearing plate. The bearing plate is press fitted into the inside of the cap and the control mount is also press fitted into the cap. However, the dimple lock is provided to prevent the shaft bearing plate from rotating inside of the cap when the projections on the pivot bearing strike the stops 60—60 on the bearing plate. The cap at its forward end has a right angular flange 74 thereon, the major portions of the flange being at the two sides of the cap. The flange has four apertures in it to receive four screws 75 which pass through the cap flange, through appropriate flanges on the control mount, and thread into tapped bores in the back of the faucet body. Locator pins 76 which extend rearwardly from the faucet body may be provided to correctly align the cap with respect to the faucet body in assembly. The upper edge of the cap flange, it will be noted, is notched out to provide clearance for the adjustment screw 57 for the shaft seal. The screws 75 hold the cap in place with respect to the faucet body and thus also hold all of the parts of the bearing and seal assembly in place. The innermost member of the assembly is the control mount and its inner end is machined to fit inside of the enlarged circular bore which extends into the rear of the faucet body. The juncture between the control mount and the faucet body is sealed by means of an O ring 77 which is seated within a groove extending around the inside of the enlarged central bore at its outer end where the O ring may contact the control mount.

It may be seen therefore that the faucet handle may be swung from side to side to pivot around the longitudinal axis of the shaft 47 and that it also may be swung forwardly from the upright position by pivoting around the pin 67 which is mounted in the pivot bearing. Two stops 60—60 define the limits of the movement of the handle from side to side. The limits of the forward and backward movements of the handle are defined, however, by the engagement of the cam 12 respectively with the forward end of the control mount and the wall which defines the forward end of the hollow interior of the faucet body. Movement of the handle within the limits thus defined results in control flow of water from the two valve assemblies in all proportions of hot and cold as desired.

Having described my invention, I claim:

1. In a mixing faucet having a faucet body with a mixing chamber therein, a pair of toggle valves seated in opposite sides of the faucet body to control the flow of water into said mixing chamber, each toggle valve having an elongated, rigid valve stem and being adapted to open upon the tipping of its valve stem, the respective valve stems being angulated with respect to one another and extending toward one another into the mixing chamber upon axes forming a V, a valve actuator shaft slidably and rotatably mounted within the faucet body for movement lengthwise of and around an axis which is normal to the plane of said V and which passes through the plane of said V at a point between and equidistantly spaced from the sides of the valve stems, the inner end of said shaft being within the mixing chamber and the outer end being outside of said mixing chamber, a valve actuator cam affixed to the shaft within said mixing chamber, a handle pivotally connected to the outer end of said shaft, means at the outside of the faucet body cooperating with the handle to translate rocking movement of the handle into sliding movement of the shaft and to translate rotating movement of the handle into rotating movement of the shaft, said valve actuator cam normally disposed at one side of the plane of said V, the end of the valve actuator cam adjacent to the plane of said V being slightly smaller than the space between the stems and the longitudinal axis of the actuator shaft, the end of the cam away from the plane of said V being substantially larger than the first-mentioned end, the valve actuator cam having slanting surfaces thereon which progressively flare out away from the central axis of the shaft from the smaller end of the cam to the larger end of the cam such that upon movement of the actuator into the plane of the V the surfaces of the cam to first make contact with the sides of the valve stems are angulated with respect to the central axis of the actuator shaft to a degree substantially less than surfaces to come into contact with said valve stems as the larger end of the cam is brought into contact with the stems, whereby the movement of the valve stems per unit of longitudinal movement of the valve actuator shaft is substantially less during the initial opening of the valves than the movement of the valve stems per unit of longitudinal movement of the valve actuator shaft when the larger end of the cam is brought into contact with the sides of the valve stems.

2. In a mixing faucet having a faucet body as set forth in claim 1, said actuator shaft being mounted for slidable and rotatable movement upon an axis which is horizontal with the handle being mounted at the rear of the faucet body and projecting upwardly from its pivotal connection to the outer end of the shaft.

3. In a mixing faucet having a faucet body as set forth in claim 1 in which the shaft is mounted upon a horizontal axis with the handle being disposed to the rear of the faucet body and with the valve actuator cam normally being disposed in front of the plane of said V and slidable therefrom toward the rear of the faucet body and into the plane of the V.

References Cited in the file of this patent

UNITED STATES PATENTS

| | | |
|---|---|---|
| 775,655 | Hooper | Nov. 22, 1904 |
| 1,558,925 | Rogers | Oct. 27, 1925 |
| 1,875,509 | Shivers | Sept. 6, 1932 |
| 2,106,929 | McClure | Feb. 1, 1938 |
| 2,301,439 | Moen | Nov. 10, 1942 |
| 2,567,527 | Parks | Sept. 11, 1951 |